United States Patent
Iguchi et al.

(10) Patent No.: US 6,839,550 B2
(45) Date of Patent: Jan. 4, 2005

(54) DIVERSITY ANTENNA SWITCHING DEVICE AND METHOD, AND STORAGE MEDIUM

(75) Inventors: Takayuki Iguchi, Chuo-ku (JP); Akio Horibe, Chuo-ku (JP); Toshiaki Fujikura, Chuo-ku (JP)

(73) Assignee: Uniden Corporation, Toyko (JP)

( * ) Notice: Subject to any disclaimer, the term of this patent is extended or adjusted under 35 U.S.C. 154(b) by 449 days.

(21) Appl. No.: 10/123,231

(22) Filed: Apr. 17, 2002

(65) Prior Publication Data

US 2002/0149517 A1 Oct. 17, 2002

(30) Foreign Application Priority Data

Apr. 17, 2001 (JP) ........................................ 2001-118467

(51) Int. Cl.$^7$ ................................................. H04B 1/06
(52) U.S. Cl. .................... 455/277.1; 455/133
(58) Field of Search ................................. 455/272, 275, 455/277.1, 277.2, 132, 133, 134, 135; 375/347

(56) References Cited

U.S. PATENT DOCUMENTS

| | | | | |
|---|---|---|---|---|
| 5,375,259 A | * | 12/1994 | Lee | 455/134 |
| 5,805,643 A | * | 9/1998 | Seki et al. | 375/347 |
| 2003/0083016 A1 | * | 5/2003 | Evans et al. | 455/67.1 |

FOREIGN PATENT DOCUMENTS

| | | |
|---|---|---|
| JP | 02-202729 | 8/1990 |
| JP | 03-076436 | 4/1991 |
| JP | 07-074685 | 3/1995 |
| JP | 07-240708 | 9/1995 |
| JP | 07-250014 | 9/1995 |
| JP | 08-088592 | 4/1996 |
| JP | 08-107378 | 4/1996 |
| JP | 10-271053 | 10/1998 |
| JP | 10-313267 | 11/1998 |

* cited by examiner

Primary Examiner—Nguyen T. Vo
(74) Attorney, Agent, or Firm—Oliff & Berridge, PLC

(57) ABSTRACT

An optimum antenna is readily selected from three or more antennas, by means of an existing device which is only capable of switching between two antennas. The device of the invention comprises: a switching device for receiving signals from two antennas as a pair of antenna selected from three or more antennas, and outputting the first signal (DATADET) indicating that receiving is in progress, and the second signal (ANTSEL) indicating which antenna being used for receiving; a judgement circuit for judging which antenna is suitable for receiving and actually being used in the said pair of antenna, on the basis of the said first and the said second signal of the said switching device; a setting circuit for resetting said pair of antenna on the basis of the output of said judgement circuit; and a switching circuit for selecting two antennas which is set by the said setting circuit as a pair and supplying the output thereof to the said switching device.

11 Claims, 6 Drawing Sheets

IN EITHER CASE,
SWITCHING MADE WITHOUT CHANGE TO LOGICAL SYMBOL OF
RECEIVING ANTENNA, BEFORE AND AFTER PAIR SWITCHING:
ANT(m) IS ANTSEL=LOW or
ANT(m+1) IS ANTSEL=HIGH

DIVERSITY ANTENNA SWITCHING DEVICE AND METHOD, AND STORAGE MEDIUM

BACKGROUND OF THE INVENTION

1. Field of the Invention

The present invention relates to an antenna switching device for switching three or more antennas, and in particular, to the device, the method, and the storage medium, whereby a diversity antenna can be switched.

2. Description of the Related Art

Terrestrial radio communications are influenced of multi pass propagation for reflection by the building or other objects. If the phases of radio waves arriving from different propagation paths coincide in the same phase, then the electric field becomes stronger, and if they are in opposite phase, then the electric field becomes weaker. A communications device in a moving object moves through an electric field which varies in this way, and it is affected fading. In order to reduce fading effects, a diversity antenna switching method has been proposed.

A diversity antenna switching method utilizes the fact that if two or more antennas are provided and if the frequency, or the polarization, or the directivity, or the positions, are different between the antennas, then the received field strength will be different in the antennas, in which case, the antenna having the stronger received level is selected for receiving, thereby reducing fading effects.

It is relatively easy to switch between two antennas, and devices (integrated circuits: IC) for this purpose are commercially available. However, if using diversity involving three or more antennas, this processing is relatively complex. For example, the levels received by the antennas are accumulated and are all compared with each other in order to select the optimum antenna.

Desirably, it would be possible to select an optimum antenna from three or more antennas, by appending a simple circuit to an existing device (IC) which is only capable of switching between two antennas. Moreover, desirably, it would also be possible to apply this system to any type of diversity antenna.

SUMMARY OF THE INVENTION

The present invention was devised in order to resolve the foregoing problems, an object thereof being to provide a diversity antenna switching device, diversity antenna switching method, and program or electrical circuits, whereby an optimum antenna can be selected from three or more antennas, using an existing device which is only capable of switching between two antennas.

The diversity antenna switching device relating to the present invention comprises: the existing switching device for receiving signals from two antennas as a pair of antenna selected from three or more antennas, and outputting the first signal which indicating that receiving is in progress, and the second signal which indicating which antenna being used for receiving; a judgement circuit for judging which antenna is suitable for receiving and actually being used in the pair, on the basis of the first and the second signal of the existing switching device; a setting circuit for resetting a pair on the basis of the output of the judgement circuit; and a switching circuit for selecting two antennas which is set by the setting circuit as a pair and supplying the output thereof to the existing switching device.

The switching device comprises hardware achieved by a combination of a computer or logic circuitry.

The diversity antenna switching method relating to the present invention comprises:
the first step of receiving signals from two antennas as a pair of antenna selected from three or more antennas;
the second step of outputting the first signal which indicating that receiving is in progress, and the second signal which indicating which antenna being used for receiving;
the third step of monitoring whether or not receiving is in progress on the basis of the first signal;
the fourth step of judging which antenna is suitable for receiving and actually being used in the pair, on the basis of the first and the second signal of the second step; and
the fifth step of resetting a pair on the basis of the judgement result of the fourth step;
wherein the first step to the fifth step are repeated.

The diversity antenna switching method relating to the present invention comprises:
the first step of defining each correspondence between logical symbol of the second signal which indicating which antenna being used for receiving in the pair selected from three or more antennas, and the two antennas as the pair;
the second step of receiving a signal from two antennas as a pair of antenna selected from three or more antennas;
the third step of outputting the first signal which indicating that receiving is in progress, and the second signal;
the fourth step of monitoring whether or not receiving is in progress, on the basis of the first signal;
the fifth step of judging which antenna is suitable for receiving and actually being used in the pair of antenna, on the basis of the first and the second signal of the third step;
the sixth step of repeating the second step to the fifth step a plurality of times;
the seventh step of judging which antenna is suitable for receiving and actually being used more times with a majority decision of the results of the fifth step repeated the plurality of times; and
the eighth step of resetting a pair on the basis of the judgement result of the seventh step;
the first step to the eighth step being repeated.

The method relating to this invention is realized by electrical circuits or a computer program. For example, this program being stored on a storage medium.

This medium may be, for example, a ROM, floppy disk, hard disk, magnetic tape, magneto-optical disk, CD (including CD-ROM, and Video-CD), DVD (including DVD-Video, DVD-ROM, DVD-RAM), ROM cartridge, RAM memory cartridge with battery back-up, flash memory cartridge, non-volatile RAM cartridge, and the like.

The medium refers any type of physical means whereby information (principally, digital data and programs) is stored, and which is able to cause a processing device, such as a computer, dedicated processor, or the like, to perform prescribed functions. In brief, it covers means of any kind from which a computer downloads a program and is caused to execute prescribed functions.

DESCRIPTION OF THE PREFERRED EMBODIMENTS

Embodiment 1

A diversity antenna switching device and method relating to an embodiment of the present invention are now described with reference to the drawings.

Figure 1:
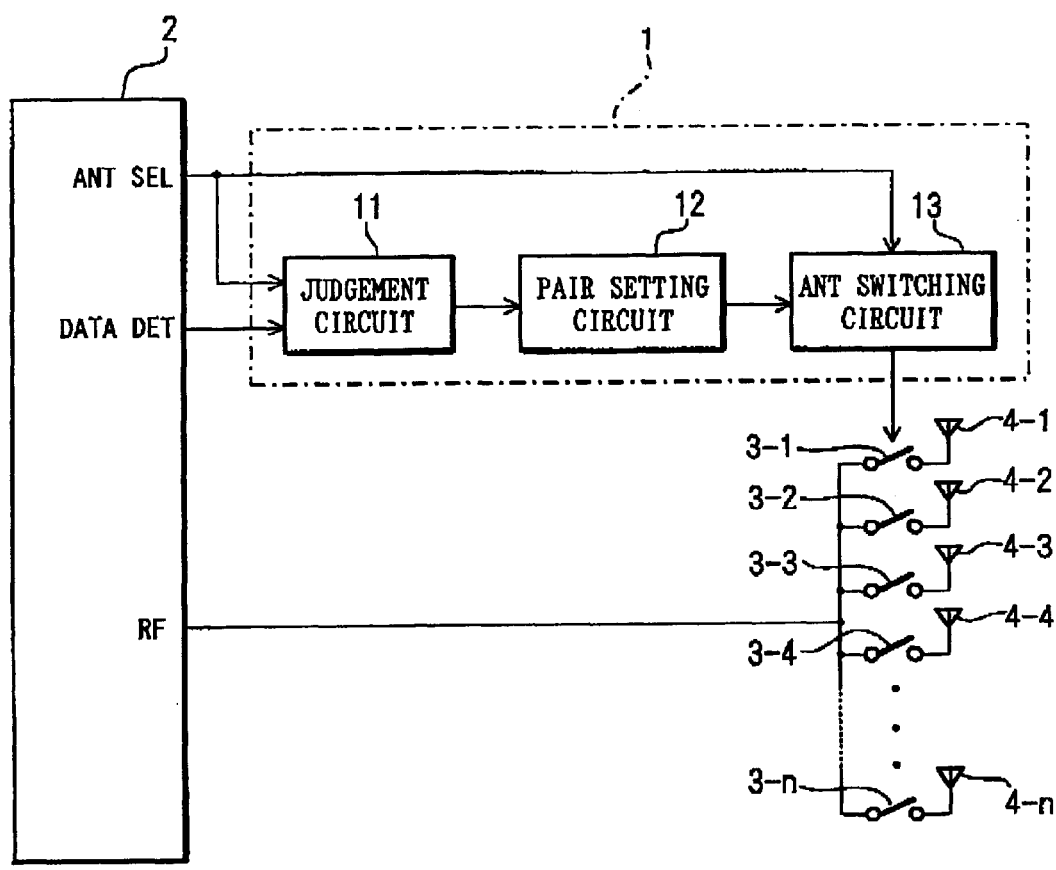
FIG. 1 is a block diagram of a device relating to an embodiment of the present invention.

FIG. 1 is a block diagram of a diversity antenna switching device relating to this embodiment. Here, the device switches the n antennas, from 4-1 to 4-n (where n≧3).

Numeral 1 is an additional circuit for applying to an existing diversity antenna switching device which is only capable of switching between two antennas, in order to switch three or more antennas. Numeral 2 is an existing diversity antenna switching device which is only capable of switching between two antennas. The switching device 2 is well-known device. The switching device 2 receives a radio-frequency (RF) signal from the antenna 4 and outputs a signal (DATADET) which indicating that receiving is in progress, and a signal (ANTSEL) which indicating which antenna being used for receiving. The ANTSEL signal outputs a HIGH level or a Low level. In other words, it is possible to know which antenna in the PAIR described below is being used, from the ANTSEL signal.

The additional circuit 1 comprises a judgement circuit 11, a pair (PAIR) setting circuit 12, and an antenna (ANT) switching circuit 13. The judgement circuit 11 monitors whether or not receiving is in progress, on the basis of a DATADET signal from the switching device 2, and if receiving is in progress, then it judges which antenna of the current pair of antennas is being used, on the basis of the ANTSEL signal. The PAIR setting circuit 12 selects two antennas from the antennas from 4-1 to 4-n, thereby setting an antenna pair, on the basis of the output from the judgement circuit 11. The ANT switching circuit 13 controls the switches form 3-1 to 3-n to select two antennas which PAIR setting circuit 12 set as a pair. For example, if the antennas 4-1 and 4-2 are set as a pair, then switches 3-1 or 3-2 are turned on.

The device and method relating to the embodiment of the present invention achieves diversity by switching between three or more antennas, by means of a simple additional system added to a conventional diversity system for selecting one antenna from two antennas. Diversity control comprising the n antennas is achieved by using two signal outputs from a conventional switching device 2 as described above. One is a signal (ANTSEL) for switching between two antennas, and another is a data receiving detection signal (DATADET) which indicating that receiving is in progress. The additional circuit 1 can know which antenna is used by the conventional switching device 2 for the ANTSEL output when the DATADET signal indicate that receiving is in progress. It uses the fact that the ANTSEL signal when the DATADET signal indicate that receiving is in progress, is indicates which antenna is actually suitable for use in receiving. Here, DATADET means a signal which it can indicate that receiving is in progress. And, the following status indication signals can be used as DATADET. Matching of unique words, ID detection, matching of spread codes, or other signals.

Figure 2:
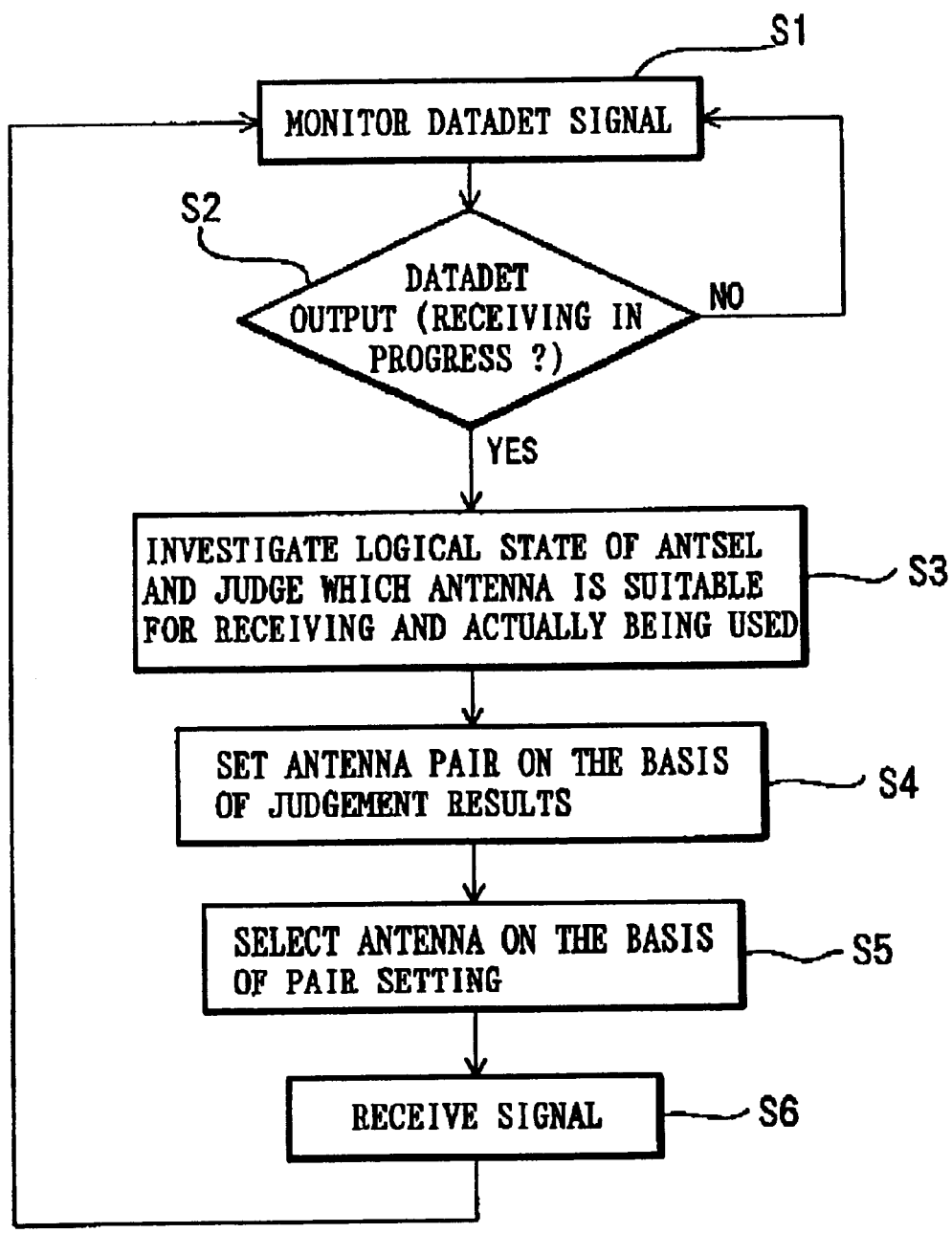
FIG. 2 is a flowchart of a method relating to the first embodiment of the invention.
Figure 3:
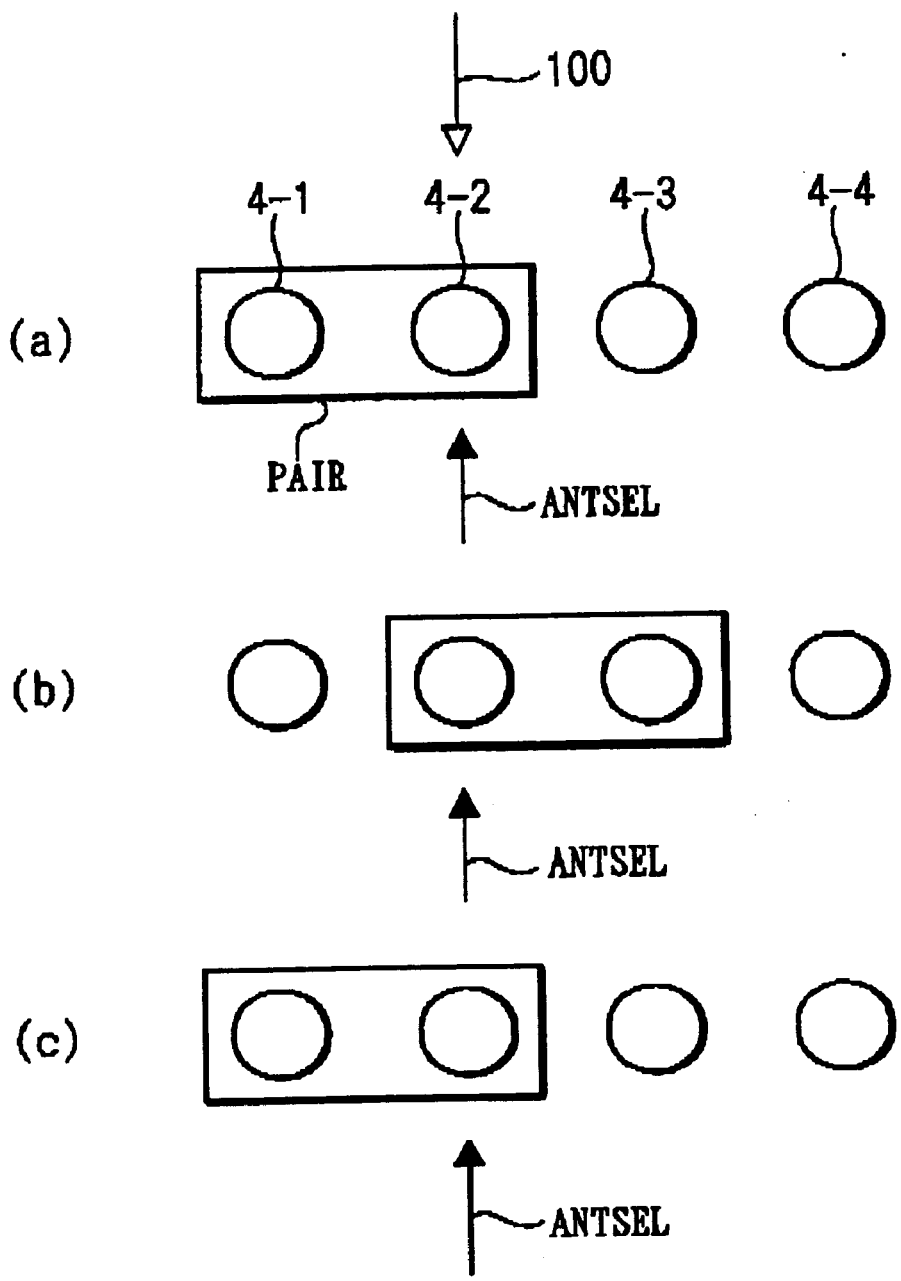
FIG. 3 is an illustrative diagram of a method relating to the first embodiment of the invention.
Figure 4:
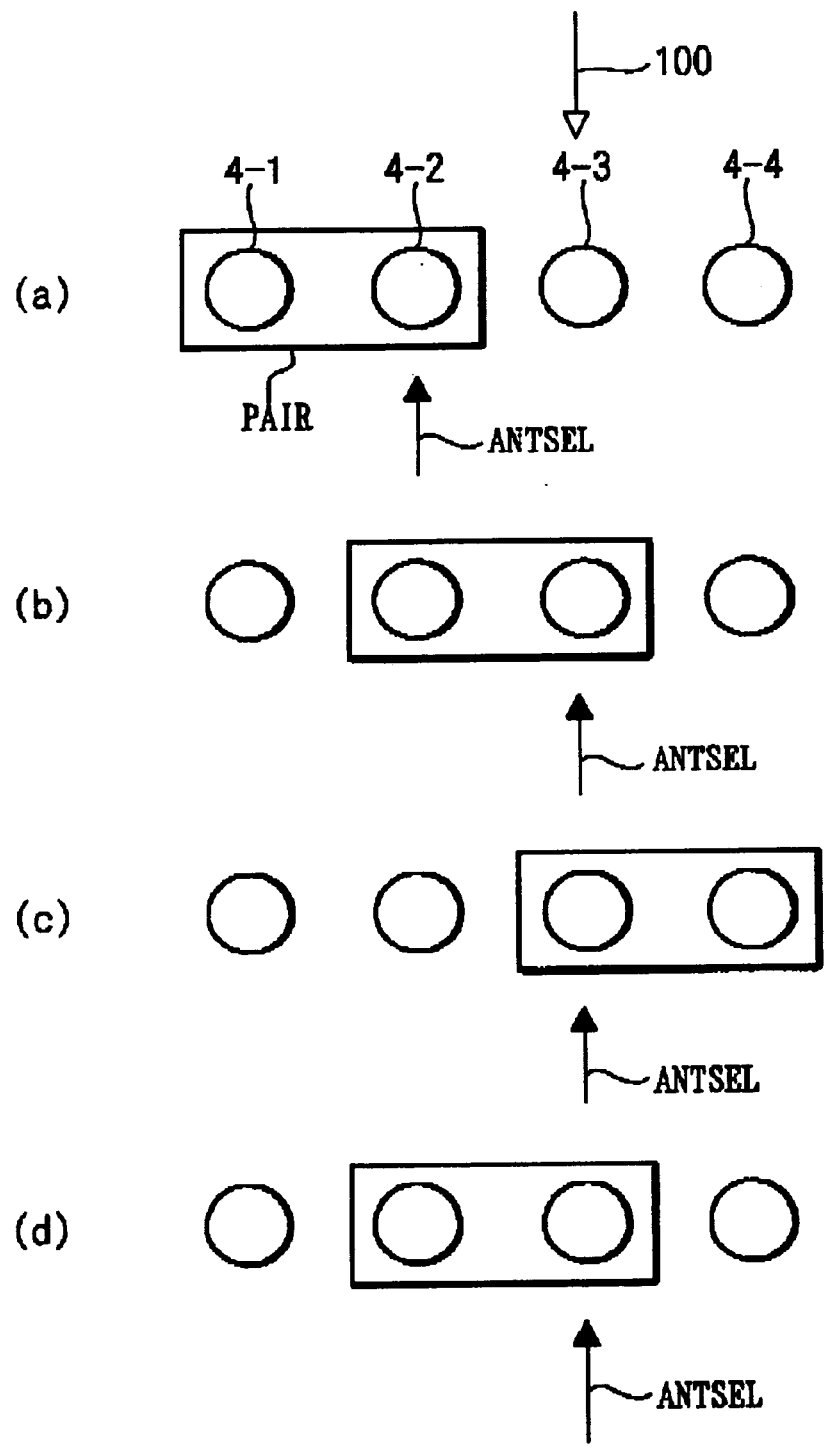
FIG. 4 is a further illustrative diagram of a method relating to the first embodiment of the invention.

Next, the device and method relating to the present embodiment, is described in relation to an example comprising four antennas, with reference to FIG. 2–FIG. 4.

S1: The additional circuit 1 monitors the DATADET signal of the switching circuit 2.

S2: When DATADET indicate receiving is in progress, in other words, when data is being received, the processing in steps S3–S6 is performed.

S3: The judgement circuit 11 of the additional circuit 1 investigates the logical state of ANTSEL to judge which of the antennas actually being used for receiving. With reference to FIG. 3, as indicated by arrow 100, the antenna 4-2 is the optimum antenna. Let it be assumed that, initially, the pair of antennas 4-1 and 4-2 have been selected, as in FIG. 3(a). In this case, the switching device 2 selects antenna 4-2, and this fact is reported to the additional circuit 1 by ANTSEL and DATADET.

S4: The PAIR setting circuit 12 of the additional circuit 1 sets up a further pair including the antenna 4-2 selected by ANTSEL, in other words, a pair comprising antennas 4-2 and 4-3 (FIG. 3(b)).

S5: The ANT switching circuit 13 of the additional circuit 1 controls the switches from 3-1 to 3-n in such a manner that the set pair are selected.

S6: The signal is received with the new pair, and the aforementioned processing is repeated.

If antenna 4-2 is selected in the subsequent processing also, then the antenna pair 4-1 and 4-2 are selected by processing similar to the foregoing (FIG. 3(c)). From this processing, the optimum antenna 4-2 is selected. Even if the optimum antenna is not 4-2 but has shifted to another antenna, by repetition of the aforementioned processing the optimum antenna will ultimately be selected (see FIG. 4).

In this way, by adopting the device and method relating to the embodiment of the present invention, it is possible readily to select an optimum antenna from three or more antennas, by using an existing conventional system which is only capable of switching between two antennas.

Embodiment 2

The foregoing example related to a case where there were four antennas. Below, a case involving the n antennas is described with reference to FIG. 5 and FIG. 6.

If there are the n antennas, then these antennas are defined as antenna (1), antenna (2), . . . antenna (n). Moreover, the antenna for pair is taken as the antenna of the adjacent number, and when antenna (m) and antenna (m+1) are selected, then this is defined as PAIR (m).

Figure 6:
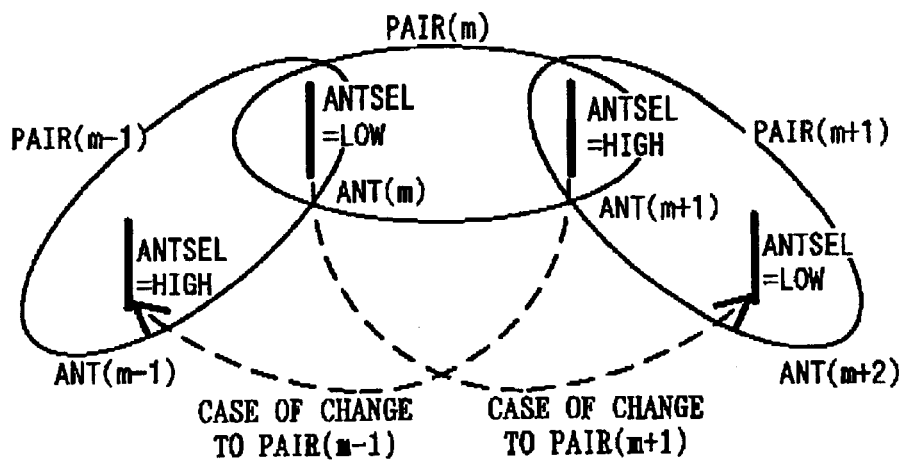
FIG. 6 is an illustrative diagram of a method relating to the second embodiment of the invention.

Moreover, when the PAIR is changed, it is necessary to prevent the ANTSEL logical symbol of the existing system corresponding to the antenna to be used continuously from switching, before and after the change. This is in order to perform optimum antenna selection even in the case of an existing system which determines an antenna by referring to previously accumulated information, and by performing this processing, as illustrated in FIG. 6, the pair switches, but the logical symbol for received antenna does not change, before and after the switching of the pair.

For example, assuming a case where PAIR(1) is switched to PAIR(2), then if ANTSEL(LOW)=ANT(1) and ANTSEL(HIGH)=ANT(2) in PAIR(1), then after switching, these will become ANTSEL(LOW)=ANT(3) and ANTSEL(HIGH)=ANT(2). In other words, the existing system and the judgement circuit determine that ANT(2) is preferable to ANT(1), and the antenna corresponding to ANTSEL(LOW)

is switched from ANT(1) to ANT(3), whilst maintaining ANT(2) as the antenna corresponding to ANTSEL(HIGH). In this change, ANT(2) is used continuously and the logical symbol of ANTSEL corresponding to ANT(2) does not change. By adopting this method, the accumulated information for ANTSEL(HIGH) in the existing system is still valid as information corresponding to ANT(2), after the PAIR has changed.

Further, in the first embodiment described above, the judgement is made by only one DATADET, but it is also possible to receive signals for a plurality of times using the same antennas PAIR, and make a majority judgement for the number of times of receiving by the antenna pair for the purpose of enhancing accuracy. Employment of this majority judgement enables selection of more suitable antennas for some existing systems used.

Figure 5:
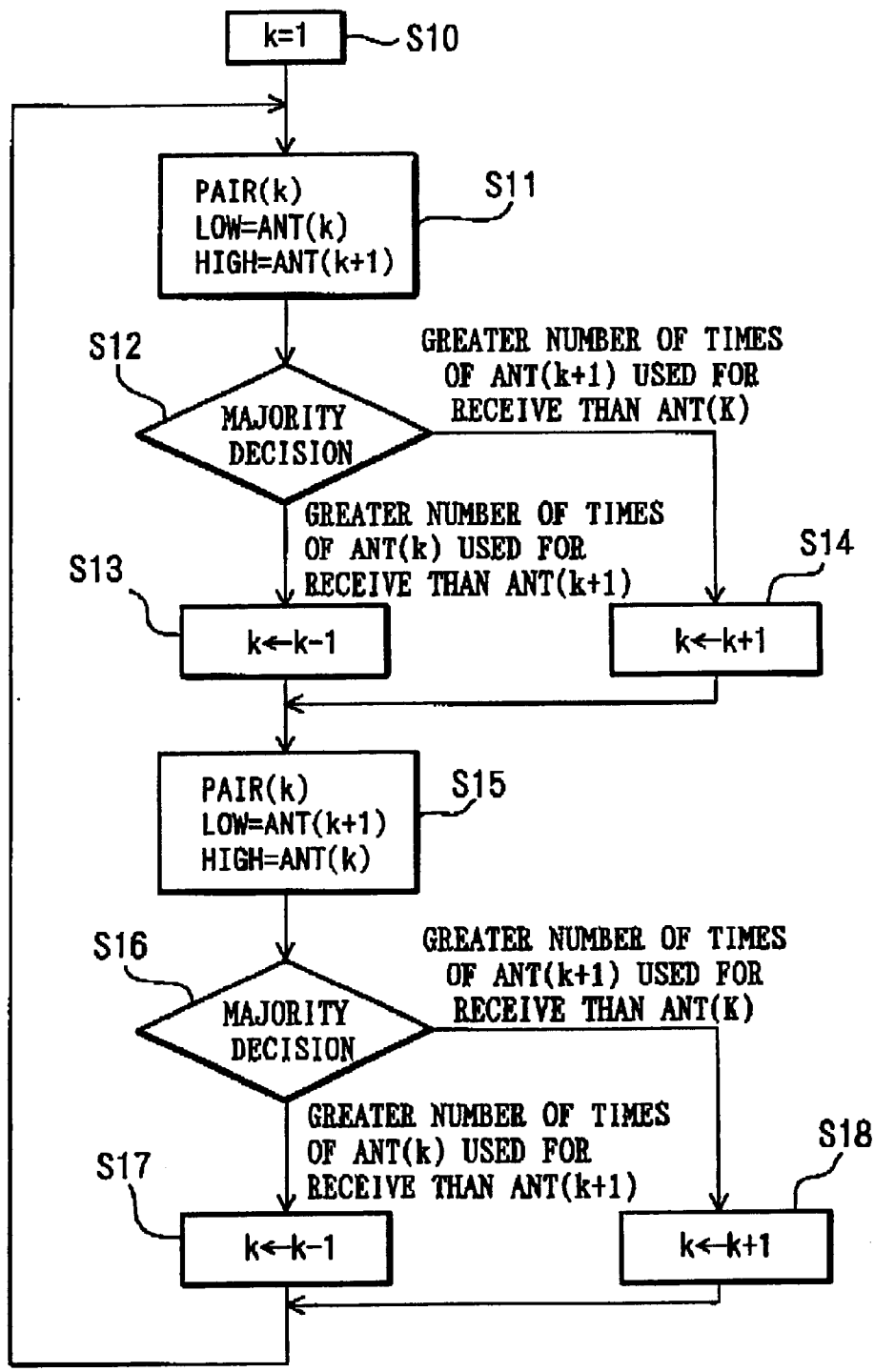
FIG. 5 is a flowchart of a method relating to the second embodiment of the invention.

Next, the flowchart of FIG. 5 will be explained.

S10: It is assumed that k=1, in order to set the first pair.

S11: The pair is set up. When k=1, the pair antenna (1) and antenna (2) is established. Moreover, the ANTSEL logical symbol is defined. If ANTSEL is LOW, then antenna (1) is selected, and if ANTSEL is HIGH, then antenna (2) is selected.

S12: ANTSEL is monitored for a plurality of receiving operations, and it is determined which antenna has been selected by majority decision from the results. In other words, if there is greater number of times of ANT(k) used for receive than ANT(k+1), then the procedure advances to S13, and if there is greater number of times of ANT(k+1) used for receive than ANT(k), then the procedure advances to S14.

S13: PAIR(k) is set and if antenna (k) is being used, then the pair of antennas is changed to PAIR(k−1).

S14: PAIR(k) is set and if antenna (k+1) is being used, then the pair of antennas is changed to PAIR(k+1).

S15: A pair is set according to step S13 or S14, and the logical symbol of ANTSEL is defined. In contrast to the case in step S11, LOW=ANT(k+1), HIGH=ANT(k).

Thereafter, the processing in steps S16–S18 is repeated in the same way, and the procedure then returns to step S11.

In the above manner, by adopting the device and method relating to this embodiment of the present invention, it is possible readily to select an optimum antenna from the n number of antennas, using an existing system which is only a capable of switching between two antennas.

Embodiment 3

Figure 7:
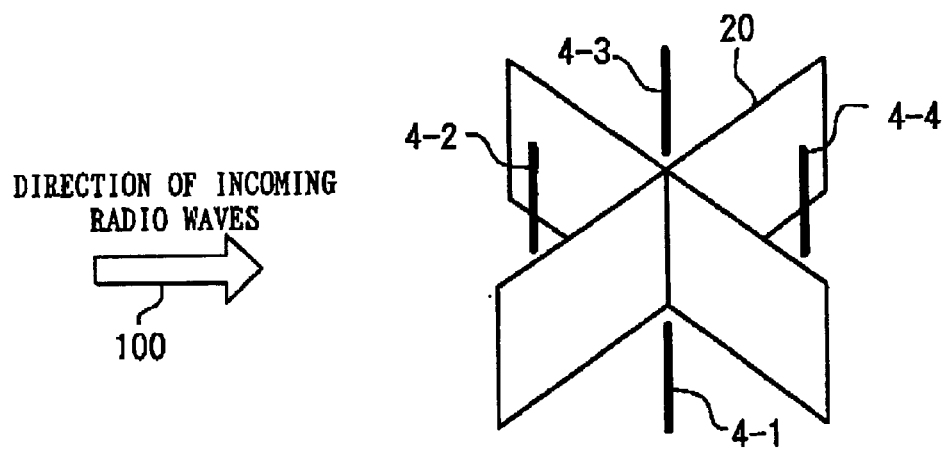
FIG. 7 is a conceptual diagram of antennas in a device relating to the third embodiment of the invention.

The third embodiment of the present invention relates to an example of directional diversity of four antennas, as illustrated in FIG. 7.

Here, antennas from 4-1 to 4-4 separated mutually by reflectors 20, have directionality in the direction in which they are disposed, respectively, and in addition to improving antenna gain viewed from the incoming signal direction 100, it is also characteristic in that it is strongly resistant to interfering waves from other directions.

The example described here relates to a method of switching to an optimum antenna using the device and method relating to this embodiment of the present invention, in a case where the direction of the incoming radio waves is not known (refer also to FIG. 3).

Here, a case is assumed where the direction 100 of the incoming radio waves is the front direction of antenna 4-2, and this antenna is selected as the optimum antenna of the four antennas.

Firstly, PAIR(1) which is the initial value, (pair of antenna 4-1 and antenna 4-2) is selected.

Here, it is determined that antenna 4-2 is more suitable than antenna 4-1.

The system switches from PAIR(1) (pair of antennas 4-1 and 4-2) to PAIR(2) (pair of antenna 4-2 and 4-3), and antenna 4-2 and antenna 4-3 are selected.

As a result, it is determined that antenna 4-2 is more suitable than antenna 4-3, and the system switches back from PAIR(2) (pair of antennas 4-2 and 4-3) to PAIR(1) (pair of antennas 4-1 and 4-2).

Next, by repeating this processing, it is possible to conduct communications using antenna 4-2, which is the optimum antenna of the four antennas.

The present invention is not limited to the aforementioned embodiments, but it may be modified in various ways within the scope of the claims, and all such modifications are of course also included the claims of the invention.

Furthermore, in the present invention, reference to means (including circuits) does not necessarily refer to physical means, but may also include vases where the functions of the respective means are achieved by software. Moreover, it is also possible for the function of a single means to be realized by two or more physical means, or for the functions of two or more means to be realized by a single physical means.

According to the present invention, it is possible readily to compose a device for selecting an optimum antenna from three or more antennas, using an existing switching device which is capable of switching between two antennas only.

What is claimed is:

1. A diversity antenna switching device for switching three or more antennas, comprising:

a switching device for receiving signals from two antennas as a pair of antenna selected from said three or more antennas, and outputting a first signal which indicating that receiving is in progress, and a second signal which indicating which antenna being used for receiving;

a judgement circuit for judging which antenna is suitable for receiving and actually being used in the said pair of antennas, on the basis of the said first and the said second signal of the said switching device;

a setting circuit for resetting said pair of antenna on the basis of the output of said judgement circuit; and a switching circuit for selecting two antennas which is set by the said setting circuit as said pair of antenna and supplying the output thereof to said switching device.

2. The diversity antenna switching device according to claim 1, wherein said judgement circuit performs receiving a plurality of times using the same pair of antenna and judge on the basis of a majority decision of these plurality of results.

3. The diversity antenna switching device according to claim 1, wherein said setting circuit includes the antenna judged to be in use by said judgement circuit in a new pair of antenna, and adds another antenna to said new pair of antenna, instead of the other antenna judged not to be in use.

4. The diversity antenna switching device according to claim 3, wherein, when setting said new pair of antenna, said setting circuit makes a logical symbol of the said second signal correspond to the two antennas included in said new pair of antenna, in such a manner that the logical symbol of the said second signal corresponding to the antenna which is to be used continuously does not change, before and after the setting.

5. A diversity antenna switching method for switching three or more antennas, comprising:

a first step of receiving signals from two antennas as a pair of antenna selected from said three or more antennas;

a second step of outputting a first signal which indicating that receiving is in progress, and a second signal which indicating which antenna being used for receiving;

a third step of monitoring whether or not receiving is in progress on the basis of the said first signal;

a fourth step of judging which antenna is suitable for receiving and actually being used in the pair of antenna, on the basis of the said first and the said second signal of the said second step; and a fifth step of resetting said pair on a basis of the judgement result of the said fourth step;

wherein the said first step to the said fifth step are repeated.

6. The diversity antenna switching method according to claim 5, wherein the said fifth step comprises: a step of including the antenna judged to be in use, in a new pair of antenna; and a step of including another antenna in the new pair of antenna, instead of the other antenna which was not in use.

7. The diversity antenna switching method according to claim 6, wherein the said fifth step comprises a step of, when setting a new pair of antenna, making a logical symbol of the said second signal correspond to the two antennas included in said new pair of antenna, in such a manner that the logical symbol of the said second signal corresponding to the antenna which is to be used continuously does not change, before and after setting.

8. The diversity antenna switching method according to claim 6, wherein, when the pair of antenna consisting of the first and the second antennas PAIR(1) is reset to a pair of antenna consisting of the second and the third antennas PAIR(2), the said fifth step comprises a step of setting ANTSEL(LOW)=ANT(3) and ANTSEL(HIGH)=ANT(2) after switching, if ANTSEL(LOW)=ANT(1) and ANTSEL(HIGH)=ANT(2) in PAIR(1) before the switching.

9. A diversity antenna switching method for switching between three or more antennas, comprising:

a first step of defining each correspondence between logical symbol of a second signal which indicating which antenna being used for receiving in the pair selected from said three or more antennas, and the two antennas as the said pair;

a second step of receiving a signal from two antennas as a pair of antenna selected from said three or more antennas;

a third step of outputting a first signal which indicating that receiving is in progress, and the said second signal;

a fourth step of monitoring whether or not receiving is in progress, on the basis of the said first signal;

a fifth step of judging which antenna is suitable for receiving and actually being used in the pair of antenna on the basis of the said first and the said second signal of the said third step;

a sixth step of repeating the said second step to the said fifth step a plurality of times;

a seventh step of judging which antenna is suitable for receiving and actually being used more times with a majority decision of the results of the said fifth step repeated said plural number of times; and the eighth step of resetting said pair of antenna on the basis of the judgement result of the said seventh step;

wherein the said first step to the said eighth step are repeated.

10. A medium storing a program for a diversity antenna switching device for switching three or more antennas, which causes said switching device to perform:

a first step of receiving signals from two antennas as a pair of antenna selected from said three or more antennas;

a second step of outputting a first signal indicating that receiving is in progress, and a second signal which indicating which antenna being used for receiving in the pair;

a third step of monitoring whether or not receiving is in progress on the basis of the said first signal;

a fourth step of judging which antenna is suitable for receiving and actually being used in said pair of antenna, on the basis of the said second signal; and a fifth step of resetting said pair of antenna on the basis of the judgement result of the said fourth step.

11. A medium storing a program for a diversity antenna switching device for switching three or more antennas, which causes said switching device to perform:

a first step of defining each correspondence between logical symbol of the second signal which indicating which antenna being used for receiving in the pair selected from said three or more antennas, and the two antennas as the said pair;

a second step of receiving a signal from two antennas as a pair of antenna selected from said three or more antennas;

a third step of outputting a first signal indicating that receiving is in progress, and the said second signal;

a fourth step of monitoring whether or not receiving is in progress, on the basis of the said first signal;

the fifth step of judging which antenna is suitable for receiving and actually being used in the said pair of antenna on the basis of the said second signal;

a sixth step of repeating the said second step to the said fifth step a plurality of times;

a seventh step of judging which antenna is suitable for receiving and actually being used more times with a majority decision of the results of the said fifth step repeated said plurality of times; and a eighth step of resetting said pair of antenna on the basis of the judgement result of the said seventh step.

* * * * *